United States Patent [19]

Houck

[11] Patent Number: 4,472,881
[45] Date of Patent: Sep. 25, 1984

[54] PORTABLE LENGTH PROBE WITH IMPROVED WHEEL PICK-UP ARRANGEMENT

[75] Inventor: David J. Houck, Baltimore County, Md.

[73] Assignee: Electronic Modules Corporation, Hunt Valley, Md.

[21] Appl. No.: 428,485

[22] Filed: Sep. 29, 1982

Related U.S. Application Data

[63] Continuation of Ser. No. 302,601, Sep. 15, 1981, abandoned, which is a continuation of Ser. No. 062,939, Aug. 2, 1979, abandoned.

[51] Int. Cl.³ .............................. G01B 7/04
[52] U.S. Cl. .................... 33/141 E; 33/142; 250/231 SE; 250/340; 250/351; 377/24; 328/20
[58] Field of Search ............. 33/141 E, 141 B, 142, 33/141.5, 124; 250/231 SE, 341, 338, 340; 324/175; 364/562; 377/24, 47, 53; 328/20; 250/351

[56] References Cited

U.S. PATENT DOCUMENTS

| | | | |
|---|---|---|---|
| 3,601,585 | 8/1971 | Paulsen | 377/24 |
| 3,735,142 | 5/1973 | Harr et al. | 250/227 |
| 3,790,761 | 2/1974 | Crabtree | 377/24 |
| 3,821,896 | 7/1974 | Grob | 324/175 |
| 3,846,647 | 11/1974 | Tanimoto | 328/20 |
| 3,886,354 | 5/1975 | Swidén et al. | 250/231 SE |
| 4,033,883 | 7/1977 | Zinmeyer et al. | 250/231 SE |
| 4,156,190 | 5/1979 | Chittenden et al. | 377/24 |
| 4,237,617 | 12/1980 | Goussios | 33/141 E |

OTHER PUBLICATIONS

Sapwell, "Inexpensive Frequency Doubler", New Electron., (GB), 12(24), Dec. 11, 1979, p. 43.

Primary Examiner—Alfred E. Smith
Assistant Examiner—Carolyn E. Fields
Attorney, Agent, or Firm—Reginald F. Pippin, Jr.

[57] ABSTRACT

A portable length probe having a length measuring wheel with light transmission holes at equally spaced angular intervals thereon, which wheel is rotatably mounted in an integral one piece nose body having a photo-responsive element and a light-emitting element disposed in aligned facing relation in a common bore formed in the nose body transverse to the wheel. The photo-responsive element is an infrared sensitive phototransistor and the light emitting element is an infrared light emitting diode (LED), and both are encased in cylindrical opaque cases which fit in generally complementary sliding relation within the bore, the cases each having an optically open end facing one another. Increased accuracy is provided by employing frequency doubler circuitry in conjunction with the wheel, in which the wheel light transmission holes are substantially uniform in angular width and are spaced apart a distance substantially equal to such hole angular width.

4 Claims, 4 Drawing Figures

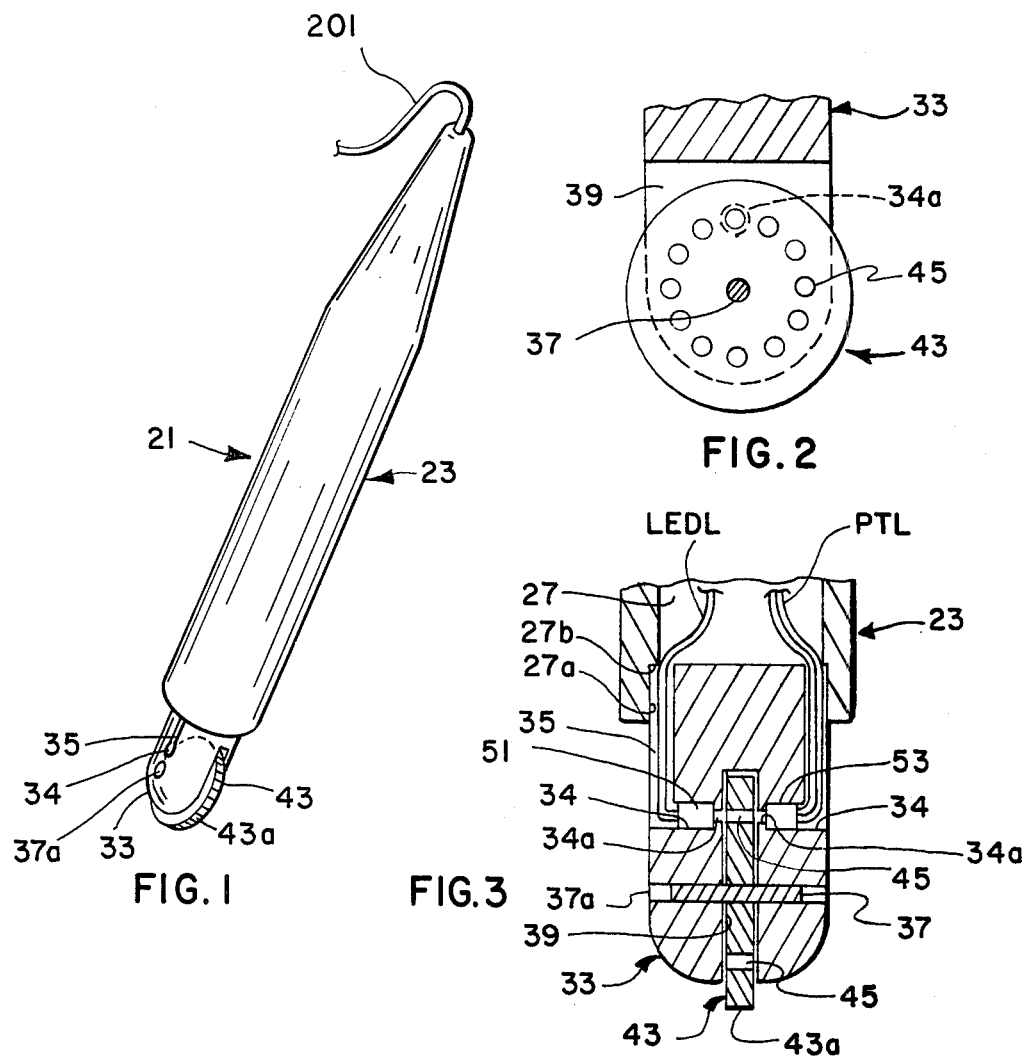
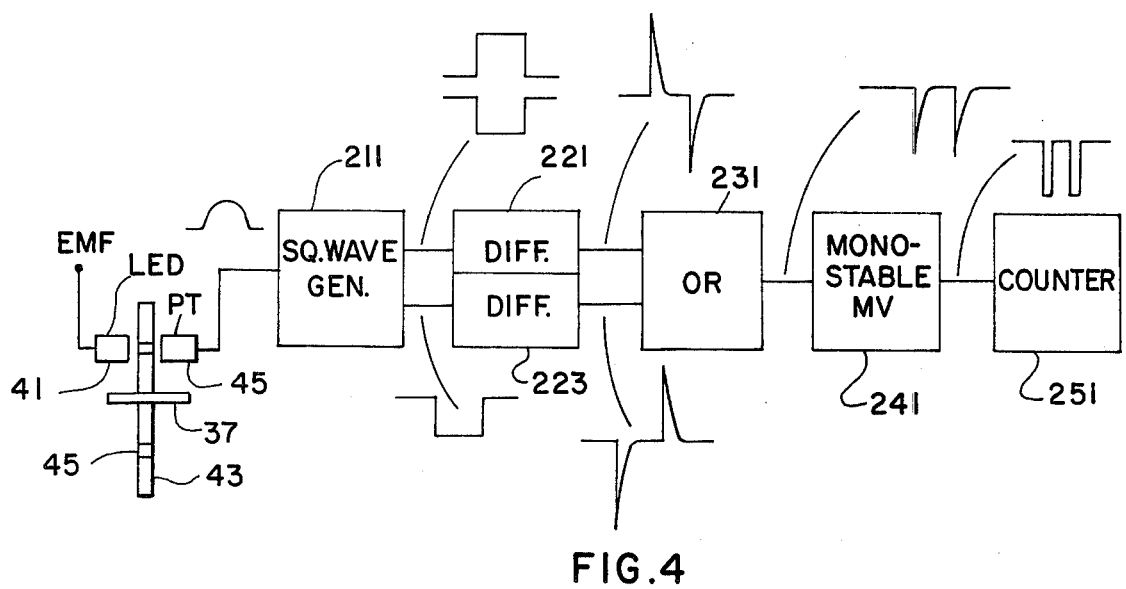

PORTABLE LENGTH PROBE WITH IMPROVED WHEEL PICK-UP ARRANGEMENT

This is a continuation of application Ser. No. 302,601, filed Sept. 15, 1981, which in turn is a continuation of application Ser. No. 062,939, filed Aug. 2, 1979, both now abandoned.

This invention relates to apparatus for measuring lengths along a surface, and more particularly to a length measurement probe of the type employing a rotatable wheel, with improved means for pick-up of signals as a function of wheel movement and providing improvement in ease of manufacture of the wheel support and pick-up arrangement.

Wheel type length measurement probes are common. Wheel movement sensing or pick-up has been accomplished by use of a filament type incandescent light emitting unit disposed on one side of the wheel and with a visible light sensitive element on the other side of the wheel, the wheel having spaced holes for causing pulses when the light is successively interrupted by and transmitted through the wheel from one side to the other. However, it has been quite difficult to manufacture and enable use of such probes with a satisfactory degree of accuracy. Among the problems have been difficulty in accurately positioning the very small miniature filament lamp, the absence of a point source or an evenly spread source of light since the filament forms an uneven and generally uncertain line source along the filament length, with consequent uncertainty of count occurrence and/or unevenness of count spacing relative to wheel movement with very small errors of placement and or orientation of the minute lamp relative to the wheel holes.

In addition, since such lamp and light sensing unit have operated in the visible light spectrum, spurious light pulses have sometimes entered the sensing unit from surrounding lighting, thereby causing false pulses indicating wheel movement and extra length that does not exist in fact. Even tight manufacturing tolerances and close attention to details of manufacture do not fully correct these problems. Furthermore, any necessity for extra close attention to details of manufacture can add materially to the cost of manufacture.

It is accordingly an object and advantage of this invention to provide a length measuring probe which enables relative ease of manufacture while providing for a high degree of accuracy of parts positioning and alignment in the wheel movement sensing arrangement of a wheel type length measurement probe.

A further object and feature of the invention is to materially reduce the likelihood of spurious ambient light causing false triggering of the wheel movement sensing arrangement in a wheel type length measurement probe.

Still further objects, features and attendant advantages will become apparent from a reading of the following detailed description of a physical embodiment according to the invention, taken in conjunction with the accompanying drawings, wherein:

FIG. 1 is a perspective view of a length probe according to the invention.

FIG. 2 is a fragmentary section view of the wheel area taken on a line adjacent to the wheel.

FIG. 3 is a fragmentary cross section view of the wheel and wheel movement sensing arrangement, taken transversely through the wheel axis.

FIG. 4 is a schematic illustration of a count registry circuit employed in use of the invention.

Referring now in detail to the Figures of the drawing, a length probe 21 is formed by an easily hand-gripped housing or main body 23, at the forward end of which is mounted a one-piece nose body 33 having a length measuring wheel 43 carried thereby in a slot 39, the wheel being freely rotatable on a bearing pin 37 press fit into transverse bore 37a and having a surface-engaging periphery 43a.

Wheel 43 has transverse holes 45 formed therein at equally spaced intervals about and within its periphery, the centers of which holes lie on a common imaginary circular locus to thereby enable the generation of pulses as a function of wheel rotation. As shown in FIG. 2, holes 45 are substantially uniform in angular width and are spaced apart a distance substantially equal to the hole angular width.

One piece nose body 33 has a tranverse bore 34a formed therethrough with an enlarged counterbore 34 formed at each end of the bore for mounting and locating respectively an infrared (IR) sensitive photo-transistor 53 and an infrared (IR) light generating light emitting diode (LFD) 51.

The smaller diameter bore portions 34a are preferably of the same diameter as wheel holes 45, and are at the same radius from bore 37 and bearing pin 37a.

Counterbores 34, 34 are formed of a diameter to slidably accommodate and locate the LED 51 and photo-transistor 53 respectively, both of which LED and photo-transistor are encased in a light-opaque conventionally cylindrical metal case, as such are conventionally supplied, open at one end and having a plastic lens over the open end.

The cases of LED 51 and photo-transistor 53 are generally complementary to their respective counterbores 34, although a somewhat loose fit may be accommodated without difficulty, in that the smaller thrubore 34a serves as the precise indexing locator for the transmission of generally evenly distributed area source IR light from the IR LED and the corresponding aligned pick up of light pulses by the photo-transistor during wheel movement, provided that the forward open end of each of the LED and the photo-transistor extends across the bore 34a. The latter condition may be assured by making the bore 34 a and holes 45 sufficiently smaller than the size of the open end of the cases and their associated cover lenses, to accommodate some side play in the LED and photo-transistor cases while still assuring line-up of an effective portion of the open lens-covered end of the photo-transistor and LED with the small diameter inner segment of bore 34 on either transverse side of the wheel 43.

Lead line slots 35 are formed on opposite outer surfaces of nose body 33, connecting with counterbores 34, which thereby enable the respective lead lines LEDL and PTL to LED 51 and photo-transistor 53 to neatly lie therein, and, through the resistance of the lead lines to bending, the recessed lead lines LEDL and PTL thus aid in holding the LED 51 and photo-transistor 53 in place in their respective counterbore segments 34. A shoulder stop is formed at the inner end of each onto counterbore segment 34, which serves as an inner locator seat or stop for the respective photo-transistor 53 and LED 51.

The cylindrical nose body 33 may be lightly press fit, for manual removal as desired, into the open cylindrical bore 27, 27a end of length probe housing 23 and is seated at the shouldered inner end 27b of cylindrical counterbore 27a.

The lead lines LEDL and PTL are thereby neatly retained in place by the side wall of counterbore 27a, which also thereby effects adequate retention of the LED 51 and photo-transistor 53 in their respective bore segments 37 without necessity for further securement. By extending the skirt formed by the counterbore 27a wall further along the nose body 33, full or more full securement of the lead lines LEDL and PTL and their associated LED 51 and photo-transistor 53 may be effective, if desired. The particular degree of counterbore or skirt extension shown is merely illustrative, and may be varied as desired or necessary.

Lead lines LEDL and PTL, as well as any other lead lines used in the probe 21 may enter and exit as a commonly covered line generally indicated at 201 and passing through a small complementary end hole in the tapered rear end of housing 23.

A suitable count registry circuit is shown schematically in FIG. 4, in which the infrared light generated electrical pulses from photo transistor 53 are fed into a square wave generator 211, which may suitably be a Schmidt trigger circuit, the output of which forms two mirror image square waves which may be fed respectively into differentiators 221 and 223. The mirror image differentiated pulses formed by the leading and trailing edges of the square wave signals are then fed into a digital OR circuit 231 which effectively forms a full wave rectifier, and which in conjunction with both input signals thereby yields an output signal having two substantially identical differentiated pulses for each wheel hole pulse from photo-transistor 53. These differentiated pulses are fed into a multivibrator 241 which forms suitable corresponding square wave pulses which are fed into counter 251, thereby registering a count number equal to twice the quantity of interception/passage occurring of holes 45 past the bore segments 34a and the associated LED 51 and photo-transistor 53. Barring accidental movement of the wheel 43 this will be a closely accurate indication of the line length traced by the wheel 43.

For further details of the circuitry employed in a length probe as well as the detailed construction of the probe and an associated marker or tracing unit and automatic cut-off switch for reducing the likelihood of false counts, reference is made to my copending applications filed on the same date as this application, and being Ser. No. 62,941 for Length Probe with Tracing Unit, now U.S. Pat. No. 4,253,239, and Switch Arrangement and Ser. No. 62,942 for Portable Hand-Held Length Probe with Tracing Unit-Actuated Length Signal Output Control Switch, now U.S. Pat. No. 4,275,264, the respective specification and drawings of each of which applications are hereby incorporated herein by reference.

While the invention has been illustrated and described with reference to a particular illustrative embodiment, it will be appreciated that various modifications and improvement may be made without departing from the scope and spirit of the invention. Accordingly, the invention is not to be limited by the particular illustrative embodiment, but only by the scope of the appended claims.

I claim:

1. A portable length probe comprising
a portable probe having a nose body with a wheel slot formed therein,
a light passage bore formed in and extending through said nose body transverse to said wheel slot,
a light-emitting element having a case therearound and effectively open at one longitudinal end for light emission therefrom,
a photo-responsive element having a case therearound and effectively open at one longitudinal end only for light input therethrough to said photo-responsive element,
said photo-responsive element case being effectively opaque to light of the frequency spectrum to which the light response element is sensitive,
a wheel rotatably mounted in said slot for rotation therewithin by linear moving contact of a circumferential surface thereof with a surface to be measured,
said light-emitting element case and said photo-responsive element case fitting in generally complementary relationship within said bore on respectively opposite sides of said wheel slot and having their open ends facing one another,
said wheel having a plurality of transverse holes therein spaced apart at equal distances and on substantially equal radius centers,
said transverse holes being each of substantially the same angular width around the annular extent of said wheel and being annularly angularly spaced apart a distance substantially equal to said angular width of one of said transverse holes,
said holes being alignable with said bore having said cases and corresponding photo-responsive and light-emitting elements therein as a function of rotation of said wheel,
and leads to said light-emitting and said photo-responsive elements for connection thereof respectively with a source of EMF and pulse counting means,
a square wave generator connected in responsive square wave generating relation to the output of said photo-responsive element and forming two mirror-image square waves,
two mirror-image differentiators and a full wave rectifier having two inputs, each of said mirror-image differentiators being connected between a respective mirror-image square wave output of said square wave generator and a respective input to said full wave rectifier,
said full wave rectifier thereby yielding an output signal having two substantially identical differentiated pulses for each wheel hole pulse from said photo-responsive element, thereby enabling greater accuracy through count registries for the opposite sides of each hole.

2. A portable length probe according to claim 1, said full wave rectifier comprising a digital OR means.

3. A portable length probe comprising
a portable probe having a nose body portion with a wheel slot formed therein,
a light passage bore formed in and extending through said nose body transverse to said wheel slot,
a light-emitting element for light emission therefrom,
a photo-responsive element for light input thereto,
a wheel rotatably mounted in said slot for rotation therewithin by linear moving contact of a circumferential surface thereof with a surface to be measured, said light-emitting element and said photo-responsive element being mounted for mutual light transmitting communication through said bore and being on respectively opposite sides of said wheel slot and effectively facing one another, said wheel having a plurality of transverse holes each of substantially equal diameter therein spaced apart at equal distances and on substantially equal radius centers, said transverse holes being each of substantially the same angular width around the annular extent of said wheel and being annularly angularly spaced apart a distance substantially equal to said angular width of one of said transverse holes, said holes being alignable with said bore as a function of rotation of said wheel, and leads to said light-emitting and said photo-responsive elements for connection thereof respectively with a source of EMF and pulse counting means, a square wave generator connected in responsive square wave generating relation to the output of said photo-responsive element and forming two mirror-image square waves, two mirror-image differentiators and a full wave rectifier having two inputs, each of said mirror-image differentiators being connected between a respective mirror-image square wave output of said square wave generator and a respective input to said full wave rectifier, said full wave rectifier thereby yielding an output signal having two substantially identical differentiated pulses for each wheel hole pulse from said photo-responsive element, thereby enabling greater accuracy through count registries for the opposite sides of each hole.

4. A portable length probe according to claim 3, said plurality of transverse holes in said wheel being circular and said holes being circumferentially spaced apart a distance substantially equal to the diameter of one of said transverse holes.

* * * * *